United States Patent Office 3,458,630
Patented July 29, 1969

3,458,630
FUNGICIDAL COMPOSITIONS AND METHODS USING MESOMERIC PHOSPHONIUM COMPOUNDS
Gail H. Birum, Kirkwood, Mo., assignor to Monsanto Company, St. Louis, Mo., a corporation of Delaware
No Drawing. Filed June 13, 1966, Ser. No. 557,317
Int. Cl. A01n 9/36; C07f 9/54
U.S. Cl. 424—204  16 Claims

ABSTRACT OF THE DISCLOSURE

Fungicidal compositions comprising a mesomeric phosphonium salt of the formula

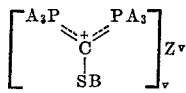

wherein A is aryl, B is alkyl, haloalkyl, phenyl and substituted phenyl, and Z is an anion, and methods for the control of fungal organisms.

---

This invention relates to fungicidal compositions and methods for the control of fungal organisms.

In accordance with this invention it has been found that fungal organisms can be controlled by exposing the fungi to an effective amount of one or more mesomeric phosphonium salts of the formula (I)

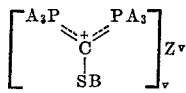

where in each A is aryl; B is an organic radical selected from the group consisting of $RX_n$ and

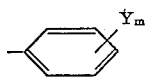

wherein R is alkyl of not more than 20 carbon atoms, X is halogen (Cl, Br, I and F), n is an integer from 0 to 5, Y is selected from the group consisting of halogen (Cl, Br, F and I) and $NO_2$, and m is an integer from 0 to 3; Z is an anion and v is the actual valence of the anion Z and is an integer from 1 to 2.

The phosphorus salts of Formula I, being mesomeric, can be represented by the formulae:

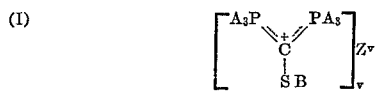

or they can be written to show the equivalence of the two phosphorus atoms as in Formula I above.

For the sake of brevity and simplicity the salts of Formula I above are sometimes represented hereinafter by the formula $$[(PA_3)_2CSB]_v{}^+Z^v$$

The mesomeric phosphonium salts of the above formulae are effective in the control of both soil-borne fungal organisms and phytopathogenic fungi. They are advantageously employed in the control of phytopathogenic fungi since they give prolonged protection against the fungal organisms following initial application. Such persistence or residual effect in the host insures prolonged protection from post treatment attacks by the phytopathogenic fungi. The present compounds exhibit microbiocidal action on a wide variety of soil-borne fungal organisms such as *Pythium ultimum* and *Rhizoctonia solani* and phytopathogenic fungi such as *Phytophthora infestans*, *Alternaria solani*, *Plasmopara viticola*, *Venturi inaequalis*, *Piricularia oryzae*, *Alternaria kikuchiana*, *Ophiobolus myabeanus*, *Pythium aphanidermatum* and *Pellicularia filamentosa*.

In the above formulae B can be alkyl such as methyl, ethyl, n-propyl, isopropyl, n-butyl, sec-butyl, isobutyl, tert-butyl, ampl, hexyl, heptyl, octyl, nonyl, decyl, dodecyl, tetradecyl, hexadecyl, octadecyl and the various homologues and isomers of alkyl having not more than 20 carbon atoms; haloalkyl such as chloromethyl, chloroethyl, trichloromethyl, tribromoethyl, 2,2-dichloropropyl, 1,4-difluorobutyl, 1,1,3,3-tetrachlorobutyl, iodopentyl, 2,3-dichloromethylhexyl, 3-trichloromethylheptyl, chlorooctyl, bromooctyl and the various homologues and isomers of haloalkyl having not more than 20 carbon atoms, aryl such as phenyl, biphenyl, naphthyl, and the like; haloaryl such as chlorophenyl, bromophenyl, 2,4-dichlorophenyl, 2,4,5-tribromophenyl, fluorophenyl and 2,4,6-trichlorophenyl and nitroaryl such as nitrophenyl, 2,4-dinitrophenyl, 2,5-dinitrophenyl, 2,4,6-trinitrophenyl and the like. When B represents $RX_n$, R is preferably alkyl of not more than 12 carbon atoms, X is Cl or Br and n is an integer from 0 to 3. Representative A aryl for Formula I include the aryl listed above for B.

In the above formulae Z can be any anion, organic or inorganic. Representative Z inorganic anions include by way of Example halides ($Cl^-$, $F^-$, $Br^-$, and $I^-$); inorganic oxyanions such as sulfate, bisulfate, nitrate, phosphate, cyanate, thiocyanate, chlorate, perchlorate, sulfide, bromate, permanganate, phosphonate and the like; perhalide anions such as $I_3{}^-$, $Br_3{}^-$, $Cl_3{}^-$ and interhalogens such as $BrCl_2{}^-$, $IBr_2{}^-$, $ICl_2{}^-$, $ClBr_2{}^-$ and the like; complex haloanions of phosphorus, silicon and boron such as $PCl_6{}^-$, $PF_6{}^-$, $PCl_3F_3{}^-$, $PBr_6{}^-$, $SiF_2{}^-$, $BCl_4{}^-$, $BF_4{}^-$, $BCl_2F_2{}^-$, $BBr_2I_2$, $BI_4{}^-$ and the like; complex hydride anions including a Group III element such as $BH_4{}^-$, $AlH_4{}^-$, $GaH_4{}^-$, and the like, and complex metallic halide anions of metals wherein the original metal to halide bond is more covalent than ionic such as Al, Sb, As, Be, Bi, Cd, Ce, Co, Cu, Ga, Au, In, Fe, La, Pb, Mn, Hg, Nb, Ni, Os, Re, Se, Ag, Ta, Tl, Sn Zn and so forth.

The metal halides used in the preparation of mesomeric phosphonium salts wherein the anion is a complex metallic halide anion are those wherein the character of the bond calculated using the electronegativity scale given at page 93 and discussed at pages 97–102 of Linus Pauling's "Nature of the Chemical Bond," 3d ed. (Cornell Univ. Pres, 1960), is less than ½ ionic. Representative metal halides which can be used to form complex metallic halide anions are the following:

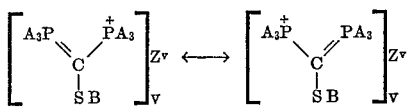

Representative Z organic anions include by way of example organic oxyanions such as carboxylates, wherein the aliphatic or aromatic, mono- or polybasic organic radical is hydrocarbon or substituted hydrocarbon, for example acetates, benzoates, glutarates, laurates, oleates and the like; anions of organic acids and hydroxyl compounds such as toluenesulfonic acid, phenylphosphinic acid, benzeneboronic acid, phenol, 2,4,6-triphenylphenol and the like, and non-oxy organic anions of organic substituted metals and boron such as tetraphenylboronate, $[Cr(SCN)_4(NH_3)_2]^-$ and the like. The preferred anions are the acid anions, inorganic and organic, perhalogen anions and complex metallic halide anions.

The mesomeric phosphonium salts of Formula I vary from solids to viscous liquids, depending upon the nature of the R substituent and the specific anion. They are essentially insoluble in water, ethers such as diglyme and in alkyl and aryl hydrocarbons such as benzene, chlorobenzene, toluene, xylene, hexane, cyclohexane and the like, and are generally soluble in lower aliphatic alcohols such as methyl alcohol, ethyl alcohol, propyl alcohol, isopropyl alcohol and in methylene chloride, chloroform and acetonitrile.

The mesomeric phosphonium salts useful in this invention are prepared by a process which comprises reacting hexaphenylcarbodiphosphorane with a sulfenyl halide of the formula $$BSX_1$$

wherein B is as defined above and $X_1$ is Cl or Br, in the presence of an inert organic medium which can be a solvent or suspending agent for either or both of the reactants. The hexaphenylcarbodiphosphorane and sulfenyl halide can be added separately or concomitantly to the reaction vessel in equimolar amounts or an excess of either reactant can be used. Temperature of reaction is not critical and good results can generally be obtained from about 0° C. to 150° C. Temperatures from 20° C. to 100° C. are preferred. Additional salts are formed from the chloride and bromide salts by metathesis, i.e. reaction of the chloride or bromide salt with free acids or the alkali metal or ammonium salts thereof, or by halogen addition or addition of metal halides such as those listed above.

The organic medium employed can be any of the well-known solvents and diluents which are inert to the reactants, e.g. aromatic hydrocarbons such as benzene, toluene, and xylene; ethers such as diethyl ether, dibutyl ether, diglyme and tetrahydrofuran; and cyclic hydrocarbons such as cyclohexane. The preferred media are the ethers in view of the ease of their removal from the products.

The separation of the desired mesomeric phosphonium salts from the reaction mixture is readily accomplished by conventional means well known in the art, e.g. filtration, frictional distillation under reduced pressure, selective extraction, fractional distillation using a carrier gas, film distillation, elution or any suitable combination of these methods.

The mesomeric phosphonium salts useful in the compositions and methods of this invention and more detailed processes for their preparation are disclosed and claimed in copending application Ser. No. 538,588 filed Mar. 30, 1966, and the disclosure thereof is incorpoarted herein by reference.

For the sake of brevity the term "active ingredient" is used hereafter in this specification to describe the sulfur-containing mesomeric phosphonium salts of Formula I above.

In carrying out the fungicidal methods of this invention one or more of the active ingredients is applied to the fungal organisms or the material or area to be treated for the control of fungi in an amount sufficient to exert fungicidal activity. The fungicidal compounds of this invention are particularly effective when applied directly to the soil or to plant life such as vegetables, ornamental plants and fruit-bearing trees. In application to soil and plants fungicidal control is obtained in most instances by the application of the active ingredient in an amount from about 0.01 to about 25 pounds per acre. The preferred amount is determined by and dependent upon the particular active ingredient selected, the method of application and the state and condition of growth of the plant as well as the climatic condition. The active ingredients can also be employed in combination with a material referred to in the art as a fungicidal adjuvant in liquid or solid form. The fungicidal compositions are prepared by admixing the active ingredient with an adjuvant including diluents, extenders, carriers and conditioning agents to provide compositions in the form of finely-divided particulate solids, granules, pellets, solutions, aerosols, dispersions or emulsions. Thus the active ingredient can be used with an adjuvant such as a finely-divided particulate solid, a liquid or organic origin, water, a wetting agent, dispersing agent, an emulsifying agent or any suitable combination of these.

Typical finely-divided solid carriers and extenders which can be used in the fungicidal compositions of this invention include for example, the talcs, clays, pumice, silica, lime, calcium carbonate, cottonseed hulls, diatomaceous earth, quartz, Fuller's earth, salt, sulfur, powdered cork, powdered wood, walnut flour, shalk, tobacco dust, volcanic ash, charcoals, and the like. Typical liquid diluents include for example, water, kerosene, stoddard solvent, hexane, benzene, toluene, acetone, ethylene dichloride, xylene, alcohols, Diesel oil, glycols and the like. Typical dilunts for aerosols include, for example, haloalkyls such as dichlorodifluoromethane, trichlorofluoromethane and the like.

The fungicidal compositions of this invention, particularly liquids and wettable particles, usually contain as a conditioning agent one or more surface-active agents in amounts sufficient to render a given composition readily dispersible in water or in oil. By the term "surface-active agent" it is understood that wetting agents, dispersing agents, suspending agents and emulsifying agents are included therein.

The term "fungicidal composition" as used herein and in the appended claims is intended to mean not only compositions in a suitable form for application but also concentrated compositions which require dilution or extension with a suitable quantity of liquid or solid adjuvant prior to application.

The following examples illustrate the invention. In these examples, as well as in the specification and appended claims, parts and percent are by weight unless otherwise indicated.

EXAMPLE 1

An intimate mixture of 2 volumes of yellow corn meal and 3 volumes of white sand is infested with *Pythium ultimum* and incubated for two weeks at 20° C. Then one volume of this infested mixture is blended uniformly with 3 volumes of a good grade of top soil which had been sterilized. To accomplish complete blending the composit of soil and infested mixture is passed through a No. 8 screen three times. A number of small cups are then tightly packed with 30 gram portions of the composite and the surface thereof leveled.

A sufficien amount of a mesomeric phosphonium salt of the formula

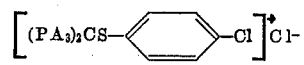

wherein A is phenyl is dissolved in acetone to make a 1% by weight solution which is then diluted with water to provide a formulation having a concentration of 0.1% by weight. To provide the desired concentration in the aforedescribed soil composite the following further dilutions with water are made:

Conc. desired in soil in p.p.m. _____ 30
Ml. of 0.1% formulation _____ 1
Ml. of water added to formulation _____ 3

The 4 ml. portions are drenched over the surface of the soil in each cup, care being taken to insure even distribution. The cups are then placed in a 100% humidity chamber at 70° F. for 44 hours. Upon removal from the chamber it is noted that there is no growth.

EXAMPLE 2

Slide germination test

The concentration of active ingredient required to completely inhibit germination of spores from 7- to 10-day old cultures of *Venturia inaequalis* is determined by the slide germination test. A concentrated formulation of 1.0 gram of the mesomeric phosphonium salt used in Example 1 above acetone, and 0.1 gram of sorbitan monolaurate polyoxyethylene derivative (a commercial water-soluble non-ionic emulsifying agent) is prepared. This concentrated formulation is diluted with sufficient water to provide an aqueous emulsion containing 10 p.p.m. of the mesomeric phosphonium salt. To a test tube is then added four volumes of the aqueous emulsion, one volume of spore stimulant and one volume of sport suspension, the spore stimulant being added to insure a high and relatively stable percentage of germination of the control. Drops of the test specimen mixture and an untreated control are pipetted onto glass slides. The glass slides are then placed in moist chambers for 20 hours incubation at 22° C. Germination counts are made by counting 100 potentially viable spores, i.e. those spores which would germinate under the normal conditions of the control. It is found that the fungicidal mesomeric phosphonium salt completely inhibits germination of the spores whereas the control spores completely germinate.

EXAMPLE 3

Young apple seedlings are each sprayed with about 10 ml. of an aqueous emulsion containing a mesomeric phosphonium salt of the formula

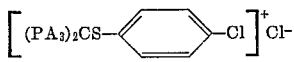

wherein A is phenyl in various amount as given in Table I. Twenty-four hours later the treated seedlings and comparable untreated control seedlings are each sprayed with a conidal suspension of *Venturia inaequalis* containing approximately $2.5 \times 10^6$ spores per ml. of water. The seedlings are then held at 65° F., 100% relative humidity, for 72 hours to permit spore germination and infestation. After incubation the seedlings are placed in a greenhouse maintained at 70° F. Fourteen days after inoculation lesion counts are made. Results and further details are given in Table I below.

TABLE I

| Phosphonium salt, p.p.m. | Percent control |
|---|---|
| 100 | 96 |
| 30 | 89 |

Mesomeric diphosphonium salts which can also be used in the compositions and methods of this invention include the following:

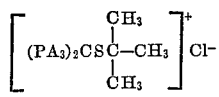
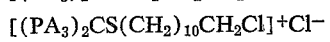

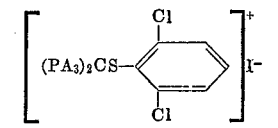
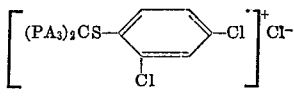
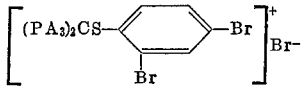
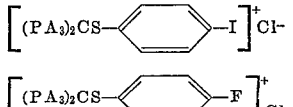
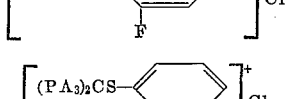
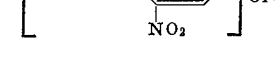

and the like wherein A represents phenyl.

As mentioned hereinbefore the fungicidal compositions of this invention comprise an active ingredient and one or more fungicidal adjuvants which can be solid or liquid extenders, carriers, diluents, spreading agents, conditioning agents and the like. Preferred fungicidal compositions containing the active ingredients of this invention have been developed so that the active ingredients can be used to the greatest advantage to modify the growth of plant systems in soil. The preferred compositions comprise certain wettable powders, aqueous suspensions, dust formulations, granules, emulsifiable oils and solutions in solvents. In general these preferred compositions can all contain one or more surface-active agents.

Surface-active agents which can be used in the fungicidal compositions of this invention are set out, for example, in Searle U.S. Patent 2,426,417, Todd U.S. Patent 2,655,447, Jones U.S. Patent 2,412,510 and Lenher U.S. Patent 2,139,276. A detailed list of such agents is also set forth by J. W. McCutcheon in "Soap and Chemical Specialties," November 1947, page 8011 et seq., entitled "Synthetic Detergents"; "Detergents and Emulsifiers—Up to Date" (1960), by J. W. McCutcheon, Inc., and Bulletin E-607 of the Bureau of Entomology and Plant Quarantine of the U.S.D.A. In general less than 15 parts by weight of the surface active agent is present per 100 parts by weight of fungicidal composition.

Wettable powders are water-dispersible compositions containing one or more active ingredients, an inert solid extender and one or more wetting and dispersing agents. The inert solid extenders are usually of mineral origin such as the natural clays, diatomaceous earth and synthetic minerals derived from silica and silicate. Examples of such extenders include kaolinites, attapulgite clay and synthetic magnesium silicate.

Preferred wetting agents are alkyl benzene and alkyl naphthalene sulfonates, sulfated fatty alcohols, amines or acid amides, long chain acid esters of sodium isothionate, esters of sodium sulfosuccinate, sulfated or sulfonated fatty acid esters, petroleum sulfonates, sulfonated vegetable oils and ditertiary acetylinic glycols. Preferred dispersants are methyl cellulose, polyvinyl alcohol, sodium lignin sulfonates, polymeric alkyl naphthalene sulfonates, sodium naphthalene sulfonate, polymethylene bisnaphthalenesulfonate and sodium N-methyl-N-(long chain acid) taurates.

The wettable powders compositions of this invention usually contain from about 5 to about 95 parts of active ingredient, from about 0.25 to about 3.0 part of wetting agent, from about 0.25 to about 7 parts of dispersant and from about 4.5 to about 94.5 parts of inert solid extender, all parts being by weight of the total composition. Where required from about 0.1 to 2.0 parts by weight of the solid inert extender can be replaced by a corrosion inhibitor or anti-foaming agent or both.

Aqueous suspensions are usually prepared by mixing together an aqueous slurry of water-insoluble active ingredient in the presence of dispersing agents to obtain a concentrated slurry of very finely-divided particles. The resulting concentrated aqueous suspension is characterized by its extremely small particle size, so that when diluted and sprayed coverage is very uniform.

Dusts are dense finely divided particulate compositions which are intended for application to the soil in dry form. Dusts are characterized by their free-flowing and rapid settling properties so that they are not readily wind-borne to areas where they are of no value. Dusts contain primarily an active ingredient and a dense, free-flowing, finely-divided particulate extender. However, their performance is sometimes aided by the inclusion of a wetting agent such as those listed hereinbefore under wettable powder compositions and convenience in manufacture frequently demands the inclusion of an inert, absorptive grinding aid. Suitable classes of grinding aids are natural clays, diatomaceous earth and synthetic minerals derived from silica or silicate. Preferred grinding aids include attapulgite clay, diatomaceous silica, synthetic fine silica and synthetic calcium and magnesium silicates.

The inert finely-divided solid extender for the dusts can be of vegetable or mineral origin. The solid extenders are characterized by possessing relatively low surface areas and are poor in liquid absorption. Suitable inert solid extenders for fungicidal dusts include micaceous talcs, pyrophyllite, dense kaolin clays, ground calcium phosphate rock and tobacco dust. The dusts usually contain from about 0.5 to 99 parts active ingredient, 0 to 50 parts grinding aid, 0 to 3 parts wetting agent and 1 to 99.5 parts dense solid extender, all parts being by weight based on the total weight of the dust.

The wettable powders described above may also be used in the preparation of dusts. While such wettable powders could be used directly in dust form, it is more advantageous to dilute them by blending with the dense dust diluent. In this manner, dispersing agents, corrosion inhibitors, and anti-foam agents may also be found as components of a dust.

Emulsifiable oils are usually solutions of active ingredient in water-immiscible solvents together with a surfactant. Suitable surfactants are anionic, cationic and non-ionic such as alkyl aryl polyethoxy alcohols, alkyl and alkyl aryl polyether alcohols, polyethylene sorbitol or sorbitan fatty acid esters, polyethylene glycol fatty esters, fatty alkylol amide condensates, amine salts of fatty alcohol sulfates together with long chain alcohols and oil soluble petroleum sulfonates or mixtures thereof. The emulsifiable oil compositions generally contain from about 5 to 95 parts active ingredient, about 1 to 10 parts surfactant and about 4 to 94 parts solvent, all parts being by weight based on the total weight of emulsifiable oil.

Granules are physically stable particulate compositions comprising active ingredient adhering to or distributed through a basic matrix of an inert, finely-divided particulate extender. In order to aid leaching of the active ingredient from the particulate, a surfactant such as those listed hereinbefore under wettable powders can be present in the composition. Natural clays, pyrophyllites and vermiculite are examples of operable classes of particulate mineral extenders. The preferred extenders are the porous, absorptive, preformed particles such as preformed and screened particulate attapulgite or heat expended, particulate vermiculite, and the finely-divided clays such as kaolin clays, hydrated attapulgite or bentonitic clays. These extenders are sprayed or blended with the active ingredient to form the fungicidal granules.

The mineral particles which are used in the granular fungicidal compositions of this invention usually have a size range of 10 to 100 mesh, but preferably such that a large majority of the particles have from 14 to 80 mesh with the optimum size being from 20 to 40 mesh. Clay having substantially all particles between 14 and 80 mesh and at least about 80 percent between 20 and 40 mesh is particularly preferred for use in the present granular compositions. The term "mesh" as used herein means U.S. Sieve Series.

The granular fungicidal compositions of this invention generally contain from about 0.01 part to about 30 parts by weight of active ingredient per 1 part by weight of clay and 0 to about 5 parts by weight of wetting agent per 100 parts by weight of clay. The preferred fungicidal granular compositions contain from about 0.1 part to about 2.5 parts by weight of active ingredient per 1 part by weight of clay.

The fungicidal compositions of this invention can also contain other additaments, for example, fertilizers, other fungicides, pesticides and the like, used as adjuvant or in combination with any of the above-described adjuvants.

Fungicides useful in combination with the above-described active ingredients include the following:

N-trichloro-methylthio-4-cyclohexene-1,2-dicarboximide,
tetramethylthiuram disulfide,
manganese ethylene-bis-dithiacarbamate,
ferric dimethyl dithiocarbamate,
zinc ethylene-bis-dithiocarbamate,
zinc dimethyl dithiocarbamate,
tetra copper calcium oxychloride,
tetrachloro-p-benzoquinone,
2,3-dichloro-1,4-naphthoquinone,
2-dichloro-6-(o-chloroanilino)triazine,
ethylene thiuram monosulfide,
2-heptadecyl glyoxalidine acetate,
ferric dimethyl dithiocarbamate plus 2-mercaptobenzothiazole,
manganese dimethyl dithiocarbamate plus 2-mercaptobenzothiazole,
copper dihydrazinium sulfate,
copper-8-quinolinolate,
cycloheximide,
terramycin,
streptomycin.

When operating in accordance with the present invention, effective amounts of the mesomeric phosphonium salts are dispersed in soil or plant growth media and applied to plant systems in any convenient fashion. Application to the soil or growth media can be carried out by simply mixing with the media, by applying to the surface of the soil and thereafter dragging or discing into the soil to the desired depth, or by employing a liquid carrier to accomplish the penetration and impregnation. The application of liquid and particulate solid phytotoxic compositions to the surface of soil or to plant systems can be carried out by conventional methods, e.g., power dusters, boom and hand sprayers and spray dusters. The compositions can also be applied from airplanes as a dust or a spray because of their effectiveness at low dosages. In a further method, the distribution of the active ingredients in soil can be carried out by admixture with the water employed to irrigate the soil. In such procedures, the amount of water can be varied with the porosity and water holding capacity of the soil to obtain the desired depth of distribution of the fungicides.

The embodiments of the invention in which an exclusive property or privilege is claimed are defined as follows:

1. Fungicidal composition comprising a fungicidal adjuvant and an effective fungicidal amount of a compound of the formula

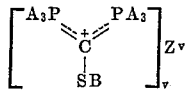

wherein each A is phenyl; B is an organic radical selected from the group consisting of $RX_n$ and

wherein R is alkyl of not more than 20 carbon atoms, X is halogen, $n$ is an integer from 0 to 5, Y is selected from the group consisting of halogen and $NO_2$, and $m$ is an integer from 0 to 3; Z is an anion selected from the group consisting of halide anions, inorganic oxyanions, perhalide anions, interhalide anions, complex haloanions of phosphorous, silicon, and boron, complex hydride anions, complex metallic halide anions, organic oxyanions, organic acid anions, and non-oxy organic anions of organic substituted metals and boron, and $v$ is the valence of the anion Z and is an integer from 1 to 2.

2. Composition of claim 1 wherein Z is Cl.
3. Composition of claim 1 wherein Z is Br.
4. Composition of claim 1 wherein B is $R-X_n$.
5. Composition of claim 1 wherein B is

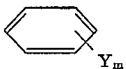

6. Composition of claim 5 wherein Y is Cl.
7. Composition of claim 1 wherein B is

and Z is Cl.

8. Composition of claim 1 wherein Z is an anion selected from the group consisting of halide anions, and complex metallic halide anions.

9. Method for the control of fungal organisms which comprises exposing the fungal organisms to an effective fungicidal amount of a compound of the formula

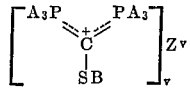

wherein each A is phenyl; B is an organic radical selected from the group consisting of $RX_n$ and

wherein R is alkyl of not more than 20 carbon atoms, X is halogen, $n$ is an integer from 0 to 5, Y is selected from the group consisting of halogen and $NO_2$, and $m$ is an integer from 0 to 3; Z is an anion selected from the group consisting of halide anions, inorganic oxyanions, perhalide anions, interhalide anions, complex haloanions of phosphorous, silicon, and boron, complex hydride anions, complex metallic halide anions, organic oxyanions, organic acid anions, and non-oxy organic anions of organic substituted metals and boron, and $v$ is the valence of the anion Z and is an integer from 1 to 2.

10. Method of claim 8 wherein Z is Cl.
11. Method of claim 8 wherein Z is Br.
12. Method of claim 8 wherein B is $R-X_m$.
13. Method of claim 8 wherein B is

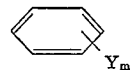

14. Method of claim 12 wherein Y is Cl.
15. Method of claim 1 wherein B is

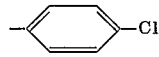

and Z is Cl.

16. Method of claim 8 wherein Z is an anion selected from the group consisting of halide anions, and complex metallic halide anions.

References Cited
UNITED STATES PATENTS 3,294,632  12/1966  Wagner.
3,334,145  8/1967  Grisley _____ 167—22 XR ALBERT T. MEYERS, Primary Examiner D. R. MAHANAND, Assistant Examiner U.S. Cl. X.R.

260—606.5